United States Patent [19]

Nakata et al.

[11] Patent Number: 5,231,128

[45] Date of Patent: Jul. 27, 1993

[54] ETHYLENE PROPYLENE RUBBER COMPOSITION

[75] Inventors: Rikizou Nakata; Masataka Sasayama, both of Aichi; Hidenori Hayashi, Gifu; Takayoshi Saiki, Aichi; Mitsumasa Horii, Aichi; Masahiro Sugiura, Aichi, all of Japan

[73] Assignees: Toyoda Gosei Co., Ltd., Nishikasugai; Kabushiki Kaisha Toyota Chuo Kenkyusho, Aichi, both of Japan

[21] Appl. No.: 670,440

[22] Filed: Mar. 15, 1991

[30] Foreign Application Priority Data

Mar. 16, 1990 [JP] Japan .................................. 2-67465

[51] Int. Cl.$^5$ .......................... C08J 5/10; C08K 3/34; C08L 23/16
[52] U.S. Cl. .................................. 524/445; 524/442; 524/447
[58] Field of Search ........................ 524/442, 445, 447

[56] References Cited

U.S. PATENT DOCUMENTS 2,919,256 12/1959 Wallgren ............................. 523/210
4,578,296 3/1986 Miyazaki et al. .................... 428/516

FOREIGN PATENT DOCUMENTS 56403 9/1966 Australia .
12668 3/1983 Australia .
59-003435 1/1984 Japan .
59-106946 6/1984 Japan .

OTHER PUBLICATIONS

L. Gonzalez et al., "Sepiolite–A new inorganic Active filler for the rubber industry," Kautschuk & Gummi Kunststoffe, vol. 40, Nov. 1987, pp. 1053–1057.
Rubber Technology, Third Edition (1987) by Maurice Morton, "Sheeting", p. 274.

*Primary Examiner*—Paul R. Michl
*Assistant Examiner*—U. K. Rajguru
*Attorney, Agent, or Firm*—Cushman, Darby & Cushman

[57] ABSTRACT

An ethylene propylene rubber composition is disclosed, comprising 100 parts by weight of a polymer component, at least 5 parts by weight of a softener, and a hydrated magnesium silicate-based clay mineral in an amount of from 0.05 to 0.5 times the weight of said softener. The rubber composition provides a molded article free from bleeding of softeners.

8 Claims, No Drawings

ETHYLENE PROPYLENE RUBBER COMPOSITION

FIELD OF THE INVENTION

This invention relates to an ethylene propylene rubber (hereinafter abbreviated as EPR) composition which provides EPR articles free from bleeding of compounding additives, such as softeners. More particularly, it relates to an EPR composition which is useful as a molding material for automobile rubber parts such as weatherstrips which are demanded to be freed from bleeding of softeners, etc. from the standpoint of appearance and feel.

BACKGROUND OF THE INVENTION

For the sake of convenience of explanation but not for limitation, description will particularly refer to an ethylene-propylene-non-conjugated diene terpolymer (hereinafter abbreviated as EPDM) as a typical example of EPR.

EPDM is sulfur-vulcanizable but has no unsaturated bond in the main chain thereof and is therefore excellent in ozone resistance, thermal aging resistance, weather resistance, and the like. It is also economically advantageous in that inorganic fillers, e.g., calcium carbonate and clay, can be compounded with in larger amounts than with other weather-resistant rubber materials, e.g., chloroprene rubber (CR), IIR, CSM. NBR/PVC.

Hence, EPDM rubber compositions have been widely used as molding materials for rubber articles in various industrial fields. For example, they have been chief molding materials for producing automobile parts, e.g., weatherstrips.

However, when large amounts of softeners are added to EPDM compositions having high contents of inorganic fillers for the purpose of improving processability, the resulting EPDM compositions tend to lose balance with the softeners due to non-polarity of EPDM. Rubber articles obtained from such EPDM compositions are therefore liable to suffer from bleeding of the softeners, which impairs appearance and feel of the articles.

As a counter measure against bleeding, attempts have been made to alter the kinds of compounding additives including softeners or to reduce amounts of compounding additives to be added but turned out to involve many problems of processability, cost, etc. It has thus been difficult to completely prevent bleeding in EPDM rubber articles.

The terminology "softeners" as used herein includes petroleum process oils, such as paraffin oils, naphthene oils, and aromatic oils, vegetable fats and oils, and plasticizers.

The terminology "bleeding" as used herein means a phenomenon that compounding additives such as softeners ooze out from the inside to the surface of rubber articles.

In order to prevent blooming (a phenomenon that compounding additives in rubber articles bloom to the surface and crystallize) of sulfur, it has been proposed to compound sulfur and sepiolite powder with a diene type rubber composition to thereby make sulfur be adsorbed as insoluble sulfur to the inside of sepiolite crystals as disclosed in JP-A-59-126442 (the term "JP-A" as used herein means an "unexamined published Japanese patent application"). This technique is to utilize sepiolite as a supporting carrier for insoluble sulfur and is therefore irrelevant to the present invention aiming at prevention of bleeding, giving no influence on patentability of the present invention.

SUMMARY OF THE INVENTION

An object of the present invention is to provide an EPR composition which provide EPR articles free from bleeding of softeners.

The present inventors have conducted extensive studies to solve the above-described problem associated with conventional EPR compositions. As a result, they have found that an EPR composition containing hydrated magnesium silicate-based clay minerals provides rubber molded articles free from bleeding of softeners.

The present invention relates to an EPR composition comprising 100 parts by weight of a polymer component, at least 5 parts by weight of a softener, and a hydrated magnesium silicate-based clay mineral in an amount of from 0.05 to 0.5 times the weight of said softener.

DETAILED DESCRIPTION OF THE INVENTION

EPR which can be used in the present invention includes an ethylene-propylene binarycopolymer (EPM) and a terpolymer comprising ethylene, propylene, and a non-conjugated diene for rendering the polymer sulfur-vulcanizable (EPDM). Blended polymers comprising EPM or EPDM with a minor proportion of other non-polar general-purpose rubbers, e.g., butyl rubber (IIR), natural rubber (NR), or olefin resins, e.g., polyethylene (PE) and polypropylene (PP), are also useful as EPR.

The EPR compositions according to the present invention essentially contains at least 5 parts by weight of a softener per 100 parts by weight of polymer component(s) (i.e., EPR or EPR based polymer in which the softener is not included). If the amount of the softener is less than 5 parts, there is no fear of bleeding of the softener, avoiding necessity of incorporating hydrated magnesium silicate-based clay minerals. An upper limit of softeners in EPDM rubber composition is usually 150 parts by weight per 100 parts by weight of polymer component(s). Particularly preferable amount of the softener used is from 50 to 100 parts by weight per 100 parts by weight of polymer components.

The hydrated magnesium silicate-based clay mineral which can be used in the present invention (hereinafter simply referred to as clay minerals) mainly comprises hydrated magnesium silicate having on the surface thereof highly reactive hydroxyl groups. The clay mineral is a aggregate of fibrous crystallites having a diameter of from about 0.005 to 0.6 μm with fine pores (transitional pores) having an average pore size of from 20 to 300 Å among the fibers and with fine pores (channels) having a rectangular section of from about 6 to 10 Å within each fiber in parallel to the fiber axis.

Specific examples of such clay minerals include sepiolite having a composition formula:

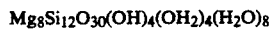

and palygorskite having a composition formula:

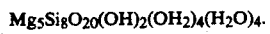

These clay minerals sometimes have magnesium or silicon partially substituted with aluminum, iron, nickel, sodium, etc. For example, palygorskite contains a slight amount of aluminum.

So-called mountain cork, mountain wood, mountain leather, meerschaum, and attapulgite correspond to these clay minerals.

In the present invention, the clay minerals can be used either individually or in combination of two or more different kinds thereof. It is preferable to use clay minerals which comprise an aggregate of fibrous crystallites having a length of not more than 10 μm and an aspect ratio (fiber length/fiber diameter ratio) of not more than 100. Such fibrous crystallites are entangled with each other to form many transitional pores having an average pore size of 20 to 300 Å to thereby produce a great effect on prevention of bleeding. Moreover, such a small aspect ratio lessens adverse influences on physical properties of rubber.

Clay minerals having a fiber length exceeding 10 μm and an aspect ratio of larger than 100 have small effect on prevention of bleeding so that they need to be incorporated in an increased proportion. However, it is difficult to increase the compounding proportion of clay minerals without adversely affecting rubber physical properties.

Of the above-mentioned clay minerals, sepiolite has channels of large pore size and a large specific surface area and thereby produces a great effect of prevention of bleeding. Sepiolite is classified into species of high crystallinity and species of low crystallinity, the former being called α-sepiolite and the latter β-sepiolite. α-Sepiolite has a smaller pore volume than β-sepiolite because of its high crystallinity and frequently occurs in a fibrous form. On the other hand, β-sepiolite generally occurs in the form of a soil-like or massive aggregate of crystallites, contains many lattice defects due to its poor crystallinity, and has increased transitional pores having an average pore size of 20 to 100 Å, which lead to an increased pore volume and an increased specific surface area. Therefore, β-sepiolite produces a greater effect on prevention of bleeding with lessened influences on rubber physical properties as compared with α-sepiolite.

In order to obtain a great effect and lessen adverse influences on rubber physical properties, the above-mentioned clay minerals are preferably used in the form of fine particles of 200 mesh or smaller (i.e., sieve opening: 0.074 mm or less (ASTM)). Clay mineral particles of this size can be obtained by dry grinding or wet grinding to a desired particle size by the use of a hammer mill, a vibration mill, a Raymond mill, a pin mill, a ball mill, a mixer, etc. If desired, the particles may be classified.

If desired, the thus prepared clay mineral particles may be calcined before use.

The clay mineral is added to EPR compositions in an amount of from 0.05 to 0.5 times (preferably from 0.1 to 0.3 times) the weight of softeners. If the amount of the clay mineral is less than 0.05 times, a sufficient effect to prevent bleeding can hardly be produced. Even if it exceeds 0.5 times, one cannot expect a further increase in effect obtained. Such a high amount use of clay minerals rather results in deterioration of rubber physical properties.

If desired, the EPR compositions according to the present invention may further contain other various compounding additives commonly employed in general rubber compositions, such as carbon black and vulcanizing agents.

The EPR compositions of the present invention can be prepared according to methods employed for the preparation of general rubber compositions. For example, compounding additives including the clay minerals, softeners, reinforcements (e.g., carbon black), vulcanizing agents, etc. are weighed and mixed with a polymer component (EPR) in an enclosed mixing machine, e.g., a Banbury mixer, an intermix, and a kneader, or in open roll mill. The thus prepared mixed rubber composition is then extruded and vulcanized, or molded and vulcanized in a mold.

As described above, since the EPR compositions of the present invention contain a specific amount of hydrated magnesium silicate-based clay minerals, they can easily prevent EPR molded articles obtained from suffering from bleeding of softeners present therein.

Although the mechanism of the bleed preventive effect brought about by addition of clay minerals has not yet been clarified, the following consideration would be safely made.

In general, softeners penetrate into a rubber texture to increase softness and are usually liquid. Therefore, if their proportion in rubber compositions exceeds an adequate value, they are apt to migrate from the inside to the surface of rubber articles to cause bleeding. The clay minerals used in the present invention have two kinds of fine pores: channels having a pore size of from 6 to 10 Å and transitional pores having a pore size of from 20 to 300 Å. It appears that the transitional pores function to condense the softeners by the capillary action and, at the same time, the channel pores of 6 to 10 Å function to absorb the softeners. As a result, the retention of softeners in the EPR compositions (i.e., a possible amount of softeners to be incorporated) can be increased.

Where softeners have polarity, their diffusion in EPR compositions is retarded by hydroxyl groups on the surface of clay mineral particles, which leads to a further increase in retention of softeners.

Further, in using β-sepiolite as a clay mineral, since it has an increased volume of transitional pores of 20 to 100 Å, the retention of softeners is further increased.

The present invention is now illustrated in greater detail with reference to the following Examples, but it should be understood that the present invention is not constructed as being limited thereto. The amount of components blended is given by weight unless otherwise indicated.

EXAMPLES 1 TO 5 AND COMPARATIVE EXAMPLE 1

Compounding additives shown in Table 1 below, except for sulfur and a vulcanization accelerator, were mixed in a 1.8 l-volume enclosed mixing machine. Sulfur and a vulcanization accelerator were then added thereto, and the mixture was kneaded in a 16-inch open roll mill to prepare a mixed composition.

The mixed composition was molded by means of a vulcanizing press at 150° C. for 30 minutes to prepare test specimens.

Hardness, tensile strength, and elongation of the specimens were measured in accordance with JIS K-6301. Further, the specimens were allowed to stand at room temperature for 30 days, and the surface condition (whether bleeding occurred or not) was observed with eyes. The results obtained are shown in Table 1.

TABLE 1

| Composition: | Example No. 1 | 2 | 3 | 4 | 5 | Comparison |
|---|---|---|---|---|---|---|
| EPDM | 100 | 100 | 100 | 100 | 100 | 100 |
| Carbon black (FEF) | 100 | 120 | 140 | 160 | 150 | 100 |
| Precipitated calcium carbonate | 20 | 20 | 20 | 20 | 20 | 20 |
| Paraffin process oil | 20 | 40 | 60 | 100 | 150 | 20 |
| β-Sepiolite (200 mesh or smaller) | 5 | 10 | 15 | 20 | 10 | 0 |
| Zinc white | 5 | 5 | 5 | 5 | 5 | 5 |
| Stearic acid | 1 | 1 | 1 | 1 | 1 | 1 |
| Sulfur | 2 | 2 | 2 | 2 | 2 | 2 |
| Vulcanization accelerator | 2 | 2 | 2 | 2 | 2 | 2 |
| Test Results: | | | | | | |
| Hardness (JIS.A) | 70 | 70 | 71 | 71 | 64 | 70 |
| Tensile Strength (kg/cm$^2$) | 115 | 110 | 100 | 95 | 90 | 120 |
| Elongation (%) | 350 | 340 | 330 | 320 | 400 | 350 |
| Bleeding (after at RT × 30 days) | none | none | none | none | none | observed |

As is apparent from the results in Table 1 above, the rubber compounds according to the present invention exhibit excellent effects on prevention of bleeding.

While the invention has been described in detail and with reference to specific examples thereof, it will be apparent to one skilled in the art that various changes and modifications can be made therein without departing from the spirit and scope thereof.

What is claimed is:

1. An ethylene propylene rubber composition comprising:

(a) 100 parts by weight of a polymer component;
   (b) at least 5 parts by weight of a softener; and
   (c) a hydrated magnesium silicate-based clay mineral selected from the group consisting of sepiolite-palygorskite clays in an amount of from 0.05 to 0.5 times the weight of said softener, thereby causing the ethylene propylene rubber composition to be free from bleeding of the softener.

2. An polymer component composition as claimed in claim 1, wherein said ethylene propylene rubber is an ethylene-propylene binarycopolymer or an ethylene-propylene-non-conjugated diene terpolymer.

3. An ethylene propylene rubber composition as claimed in claim 1, wherein said hydrated magnesium silicate-based clay mineral is an aggregate of fibrous crystallites having a fiber diameter of from 0.005 to 0.6 μm with fine pores (transitional pores) having an average pore size of from 20 to 300 Å among the fibers and with fine pores (channels) having a rectangular section of from about 6 to 10 Å within each fiber in parallel to the fiber axis.

4. An ethylene propylene rubber composition as claimed in claim 3, wherein said fibrous crystallites have a fiber length of not more than 10 μm and an aspect ratio of not more than 100.

5. An ethylene propylene rubber composition as claimed in claim 3, wherein said hydrated magnesium silicate-based clay mineral is β-sepiolite.

6. An ethylene propylene rubber composition as claimed in claim 1, wherein said hydrated magnesium silicate-based clay mineral has a particle size of 200 mesh or smaller.

7. An ethylene propylene rubber composition according to claim 1, wherein the softener is present in the amount of 5 to 150 parts by weight, relative to the amount of the polymer component.

8. An ethylene propylene rubber composition according to claim 7, wherein the softener is present in the amount of 50 to 100 parts by weight, relative to the amount of the polymer component.

* * * * *